Jan. 13, 1942.          W. A. DAVIS ET AL          2,269,621
TAPING MACHINE
Filed Oct. 3, 1940                 6 Sheets-Sheet 1

INVENTORS.
William A. Davis &
Bernard K. Davis
Parker & Burton
          ATTORNEYS.

Jan. 13, 1942.　　W. A. DAVIS ET AL　　2,269,621
TAPING MACHINE
Filed Oct. 3, 1940　　6 Sheets-Sheet 4

INVENTORS
William A. Davis &
Bernard H. Davis
BY Parker & Burton
ATTORNEYS

Jan. 13, 1942.  W. A. DAVIS ET AL  2,269,621

TAPING MACHINE

Filed Oct. 3, 1940  6 Sheets-Sheet 6

INVENTORS.
William A. Davis &
Bernard H. Davis
BY Parker & Burton
ATTORNEYS.

Patented Jan. 13, 1942

2,269,621

UNITED STATES PATENT OFFICE 2,269,621

TAPING MACHINE

William Alfred Davis and Bernard H. Davis, Hamilton, Ontario, Canada, assignors to The Aridor Company (Canada) Limited, Hamilton, Ontario, Canada Application October 3, 1940, Serial No. 359,524

25 Claims. (Cl. 216—29)

This invention relates to an improved machine for wrapping tape, such as sealing tape, about a container or the like.

An object is to provide a machine of the character specified whereby adhesive sealing tape may be wrapped about a container to secure a closure thereon. It is common practice to provide containers such as tubes, boxes, cans, or the like with end enclosures which are cup-shaped and which fit snugly over one open end. This improved machine is adapted to so receive such a closed end of a container as to expose its side wall and a portion of the side wall of the end closure and to wrap adhesive or sealing tape thereabout hermetically sealing the end closure to the container.

Numerous objects and meritorious features are present in the instant invention. The machine is of simple, rugged, inexpensive construction. It is here shown as manually operated but obviously it may be power driven.

A further object is to provide such a machine wherein the container to be wrapped is held stationary and the wrapping tape is revolved thereabout and severed following each revolution.

A further object is to so revolve the sealing tape carrier about the container being wrapped as to withdraw tape in excess of that required for a single wrap so as to provide an overlap on the wrap and to provide withdrawn tape to be projected for anchoring against the next container to be wrapped.

A further object is to provide a machine of the character specified which includes an ironer that revolves about the article being wrapped and urges the tape withdrawn from the carrier against the article. In its revolution the iron follows the tape carrier about the wrapped article.

Meritorious features reside in the provision of means whereby following each revolution of wrapping and securing the tape about the container the iron is withdrawn away from the container permitting ready removal of the wrapped container and insertion of an unwrapped one and permitting projection of the tape end between the iron and the unwrapped container; the provision of means whereby the tape carrier is constrained during a portion of its revolution to follow an eccentric path to withdraw tape in excess of that required for a single wrap about the container; and the provision of means whereby the carrier is caused to move to project the severed tape end into position for gripping by the iron against the unwrapped container at the inception of the wrapping movement.

A further meritorious feature resides in the provision of a perforating knife automatically operable upon the completion of each wrapping of the container to sever the tape between the article which has been wrapped and the tape carrier; the provision of means disposed in the path of revolution of the ironer and knife to accomplish withdrawal of the ironer away from the container and actuation of the knife toward the tape for severing; and the provision of a guide engaging the adhesive free surface of the advancing tape constraining the tape out of a direct line between the article being wrapped and the point of delivery of the tape from the carrier whereby the tape follows an angular path and its adhesive coated side does not contact the guide and the tape is arced by the guide so as to facilitate its projection toward the container to be wrapped. Throughout the specification and claims the term "container" is used to describe the article being wrapped and specifically the article illustrated is a cylindrical paper tube such as used as a carrier for milk bottle caps, which tube is provided with an end closure. Tubes other than circular in cross section may be used or other similar articles might be so wrapped and the term "container" is intended as generic to cover such other articles.

The above meritorious features and many others will more fully appear from the following description, appended claims, and accompanying drawings, wherein:

Figure 12:
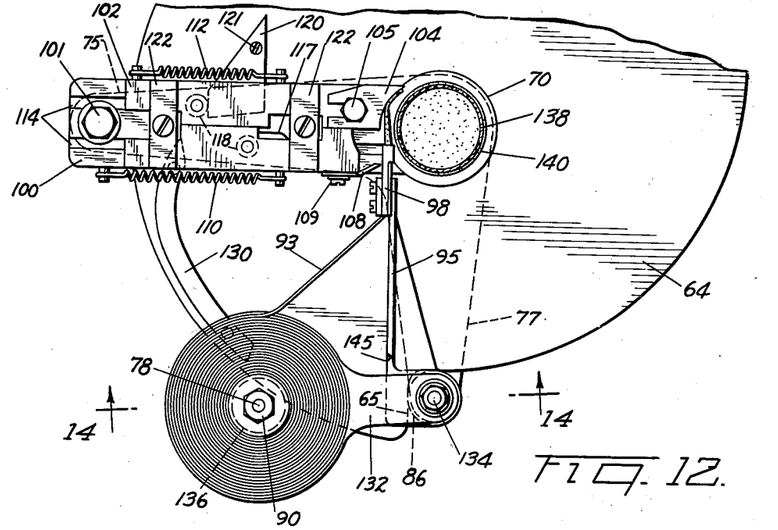
Fig. 12 is a fragmentary plan of a slightly modified structure as compared with the construction of Fig. 10 and showing the relative position of the parts immediately prior to the inception of the wrapping operation.
Figure 13:
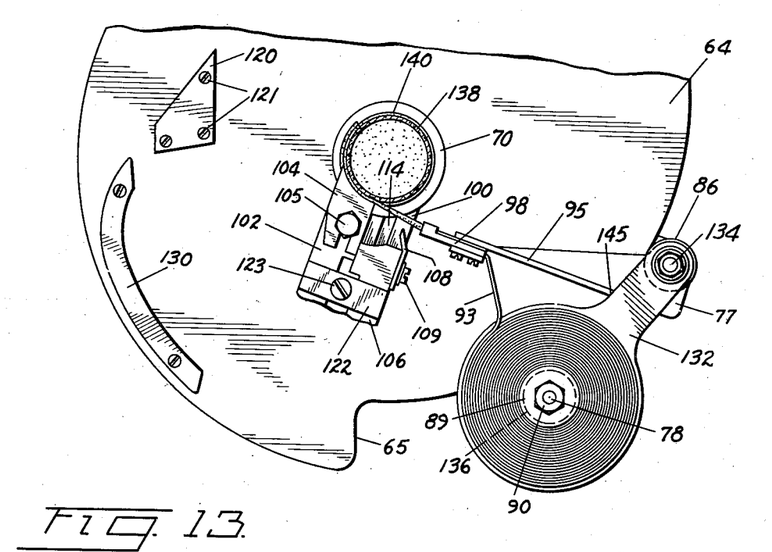
Fig. 13 is a fragmentary plan of the structure shown in Fig. 12 and showing the relative arrangement of the parts, partly broken away, shortly after the wrapping operation has been instituted.
Figure 14:
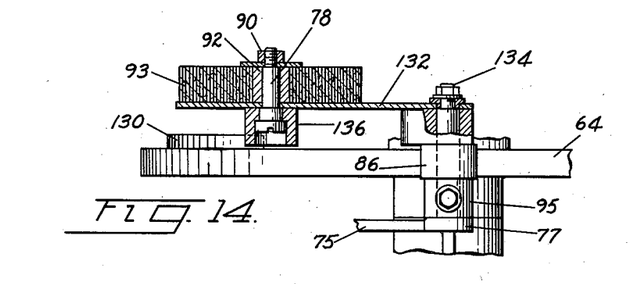
Fig. 14 is a sectional view taken on line 14—14 of Fig. 12.

The first eleven figures of the drawings illustrate a primary modification of the invention. Figs. 12, 13 and 14 illustrate a modification wherein adhesive tape which is very strongly adhesive may be utilized, the construction of these figures being adapted to insure withdrawal of the adhesive tape from the roll.

Figure 19:
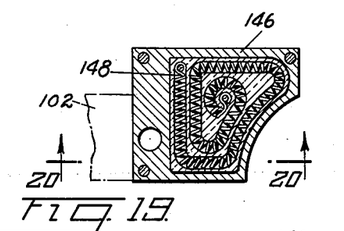
Fig. 19 is a horizontal sectional view through an ironer of the general character shown in Figs. 1 to 13 but provided with an electric heating coil.
Figure 20:
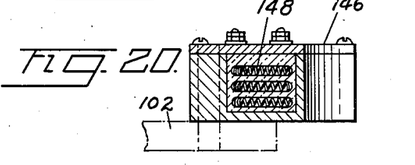
Fig. 20 is a sectional view taken on line 20—20 of Fig. 19.

Figs. 15, 16, 17 and 18 relate to provision for wrapping non-circular containers. Figs. 19 and 20 relate to a modification in the form of a heated iron.

Considering first the construction shown in Figs. 1 to 11, the machine comprises a pedestal having an upright tubular portion 32 surrounding an upright standard 34 supported by and secured to a base 30 by a set screw 36. A bracket 38 is fixed to the upright standard by set screw 40. This bracket provides a bearing 42 within which a shaft 44 is journalled. This shaft is provided at its outer end with a crank handle 46 and at its inner end with a drive gear 48. Drive gear 48 meshes with and drives gear 50. Gear 50 is journalled upon the standard 34 above the tube 32 and is provided with an upwardly extended hub 52 to which hub is secured for rotation therewith certain operating mechanism hereinafter described.

Figure 1:
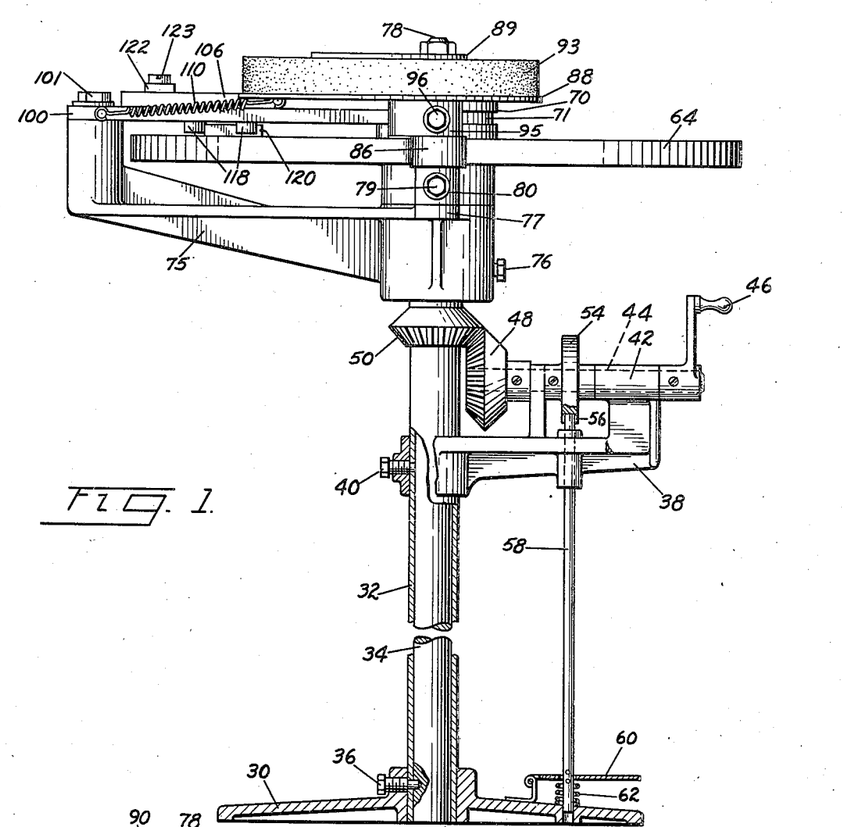
Figure 1 is a side elevation partly broken away of a machine embodying the invention.

Crank shaft 44 has a disc 54 fixed thereto and this disc is notched at 56. A plunger 58 extends through the bracket arm 38 and is supported at its lower end by a treadle 60 held in the upraised position by a spring 62. As shown in Fig. 1 the plunger engages in the notch 56 in the disc 54 and locks the shaft 44 against rotation by the handle 46. Depression of the treadle withdraws the plunger and releases the shaft 44 to manual rotation.

Figure 3:
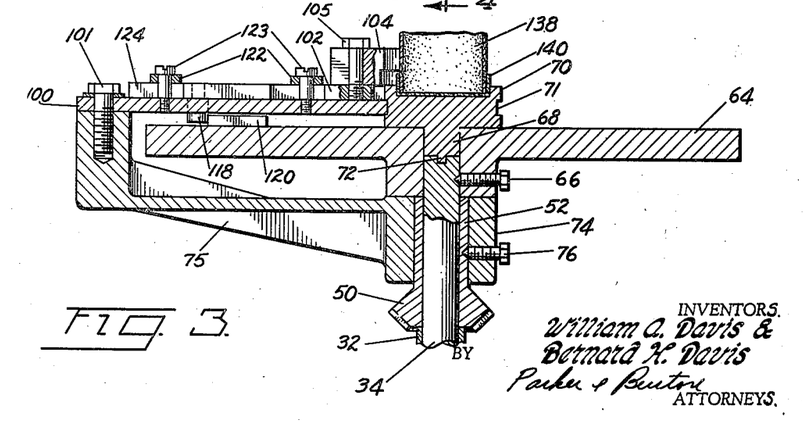
Fig. 3 is a sectional view taken on line 3—3 of Fig. 2.

A table disc 64 is apertured to receive standard 34 and secured thereto by screw 66. Within this aperture above the standard is seated a portion 68 of a container support or socket 70. The portion 68 is provided with a rib or key 72 seated within a kerf in the end of the standard 34 as illustrated in Fig. 3. This container socket is shown in detail in Fig. 15. The container support and the table are therefore stationary with the standard 34.

Tape roll dispensing carrier mechanism and ironer mechanism are supported to revolve about the socket. A hub 74 is secured by screw 76 to the extended hub 52 of gear 50 to rotate therewith. Hub 74 is provided with arms 75 and 77, which arms project outwardly radially from the hub at right angles to each other. Arm 77 carries the tape roll. Arm 75 carries the ironer mechanism and a cutting knife. As the hub 74 revolves with the gear 50 when driven by gear 48 and shaft 44 this tape roll and ironer revolve about the socket 70.

Figure 4:
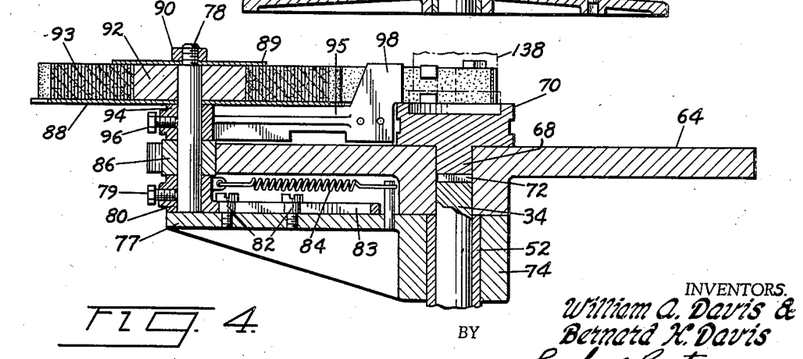
Fig. 4 is a sectional view taken on line 4—4 of Fig. 2.
Figure 5:
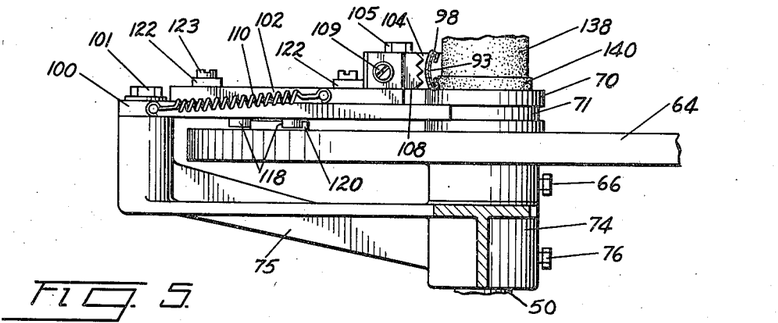
Fig. 5 is a view taken on section line 5—5 of Fig. 2.

The tape roll carrier arm 77 has a spindle 78 secured by set screws 79 to the end of a plate 80 which plate is slidably supported upon the arm by screws 82. The plate 80 is cut out providing a guide way 83 through which these screws extend so that the plate is permitted an in and out slidable movement with respect to the arm. A spring 84 is shown in Fig. 4 as tensioning the plate inwardly. The spindle 78 carries a guide or bearing roller 86 which is adapted to ride over the periphery of the disc 64 which periphery serves as a guide trackway.

The spindle also carries a pair of spaced apart plates 88 and 89 which position the roll of tape 93. The uppermost plate 89 is held in position by a nut 90. The tape roll is provided with a core 92. Plate 88 is spaced above the table by the hub 94 of a guide arm 95. The guide arm hub is secured to the spindle 78 by set screw 96. This guide arm 95 carries a guide 98 which serves to guide the tape withdrawn from the roll toward the article to be wrapped. (Note Figs. 2, 10 and 11.) Spring 84 holds the guide roller 86 against the periphery of the disc 64 during the revolution of the arm 77 causing such guide roll to follow the contour of the disc.

To support the ironer and cutting knife there is fixed to the outer end of the arm 75 a plate 100 by screw 101. Two slidable members are supported upon this plate 100. There is an ironer slide 102 which carries an iron element 104 secured thereto by a set screw 105 (note Figs. 2, 6, 10 and 11). There is a cutting element 106 to which is secured a perforating knife 108 by screw 109. The ironer assembly and the cutting knife assembly are each independently slidably supported upon the plate 100 for in and out movement.

The cutting knife is held outwardly away from the article being wrapped by tension spring 110 secured at one end to the slidable cutting knife plate 106 and at the other end to the fixed plate 100. The ironer plate assembly is held inwardly toward the article being wrapped by a spring 112 secured at one end to the ironer plate 102 and at the opposite end to the fixed plate 100.

The fixed plate is provided with parallel channels or guide ways 114 formed in its upper face within which are received lands 116 formed on the underside of the slidable plates 102 and 106 and which guide their reciprocation. The fixed plate 100 is provided with two oval shaped apertures 117, one through each guideway 114 underneath the slidable plate as shown in dotted line in Figs. 2 and 7.

Each slidable plate has a fixed pin or cam follower 118 depending therebelow into an aperture 117. These cam pins 118 project downwardly and just clear the disc 64. They are for the purpose of being engaged by a fixed cam 120 secured to the disc 64 by screws 121 as the assembly revolves.

Figure 2:
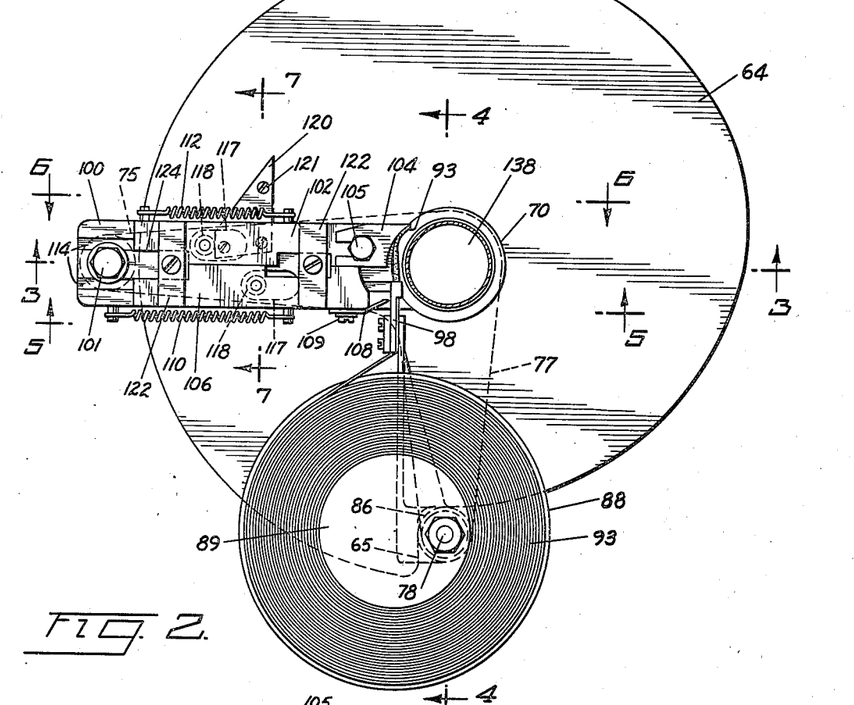
Fig. 2 is a plan of the machine illustrated in Fig. 1.

To hold the slidable plates 102 and 106 against the fixed plate 100, two cross bars 122 are secured thereover by screws 123 as shown in Figs. 2 and 3. The slidable plates are cut away at their ends as at 124 adjacent the screws to permit slidable movement in and out of each plate.

The fixed plate 100 is arcuate shaped at its inner end and rides within channel 71 in the container socket 70 to hold the ironer and cutting knife assembly against axial displacement. The cam plate 120 is angular shaped as shown so that in the counter clockwise revolution of the ironer and cutting knife assembly arm over the disc the pointed end of this plate enters between the pins 118 and slides the cutting knife plate 106 inwardly against the tension of its spring 110 and slides the ironer plate 102 outwardly against the tension of its spring 112 as shown in Figs. 11 and 12 respectively.

Heretofore it was stated that there was mounted on the spindle 78 of the tape carrier arm 77 a guide plate arm 95 carrying a guide 98. This guide 98 is arcuate as shown particularly in Fig. 5 so that the tape 93 passing therethrough is arched as shown about a longitudinal line. The adhesive free back of the tape rides against the guide. The turned over margins of the guide do not engage the adhesive coated surface as will be noted from Fig. 5. Furthermore because of this arching of the tape it is stiffened to be projected more readily without doubling toward the article being wrapped at the beginning of each wrapping movement.

Figure 10:
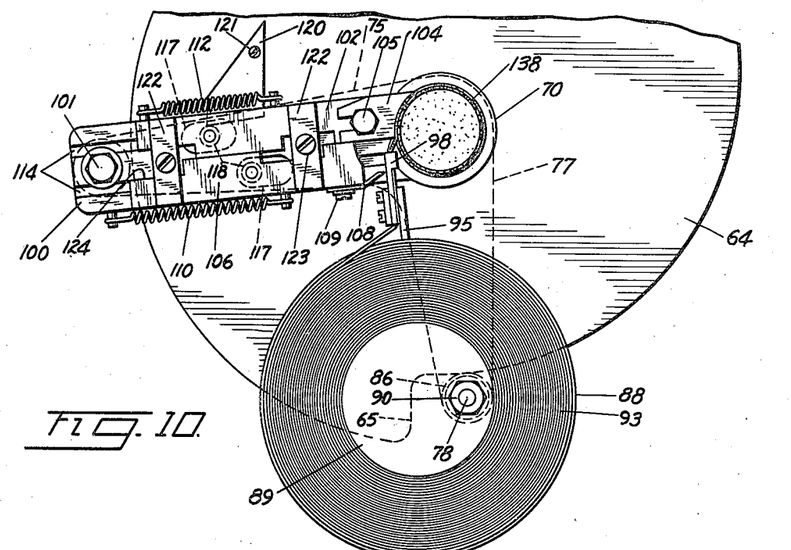
Fig. 10 is a fragmentary plan showing the relative position of the parts following the commencement of a wrapping operation.
Figure 11:
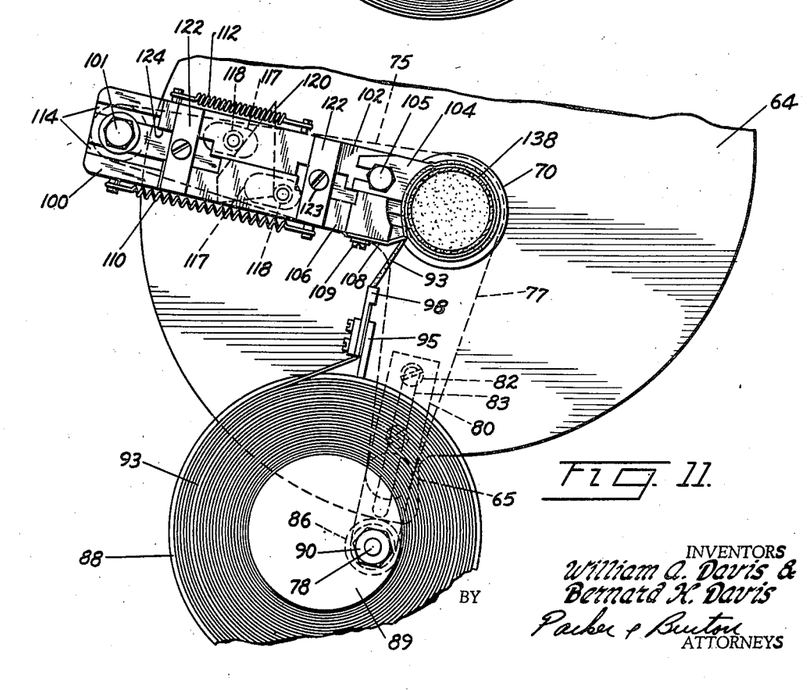
Fig. 11 is a fragmentary plan of the same structure shown in Fig. 10 but showing the relative position of the parts at the severing of the tape in the conclusion of the wrapping operation.

It will be noted from Figs. 2, 10 and 11 that this guide is so positioned that the portion of the tape which extends between the article being wrapped and the exit of the tape dispensing carrier is constrained or deflected which causes the adhesive free face of the tape to be drawn over the surface of the guide rather than the adhesive coated face of the tape. This facilitates the withdrawal of the tape through the guide and its advance therethrough in the projection of its free end to be anchored against an article to be wrapped as hereinafter described.

Figure 15:
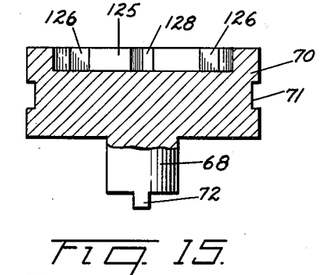
Fig. 15 is a side elevation of the container positioning socket.
Figure 16:
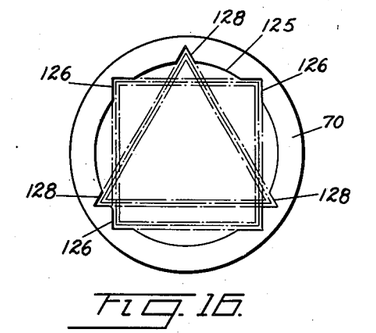
Fig. 16 is a plan of the container positioning socket shown in Fig. 15.

The socket within which the end of a container to be wrapped is inserted is shown in detail in Figs. 15 and 16. It has heretofore been described how the tongue 72 of this socket engages within a cut out in the end of the standard 34 to fixedly position the socket. This socket may be cut out interiorly as shown in Figs. 15 and 16 to receive either a cylindrical container as indicated by line 125 to position the same or to receive a square container as indicated by the cut out lines 126 or a triangular container as indicated by the cut out lines 128. In Figs. 1 to 13 inclusive a cylindrical container is shown. These socket elements are replaceable and socket supports of different size might be provided.

In the construction shown in Figs. 12 and 13 there is a small difference which resides in the support provided for the roll of tape. The disc 64 is here provided with an arcuate cam strip 130, as shown. The tape roll is mounted upon a spindle 78 which may be of the character heretofore described and which is itself carried by a secondary arm 132 swingably supported upon a pivot 134 at the outer end of arm 77. This represents a modification the purpose of which is hereinafter described. There is one other difference in this modification as compared with the construction shown in Figs. 1 to 11 and that is that there is a guide roller 136 supported below the swinging secondary arm 132 upon the projected end of the spindle 78, as shown in Fig. 14, which travels above the table 64 and is adapted to engage the cam strip 130 to be actuated thereby (note Fig. 14) as will hereinafter fully appear.

Figure 17:
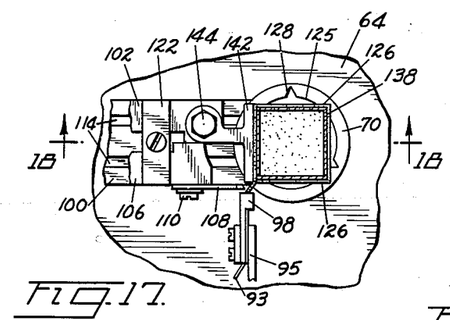
Fig. 17 is a horizontal fragmentary section showing a non-circular tubular container being wrapped and a modified type of ironing mechanism utilized therewith.
Figure 18:
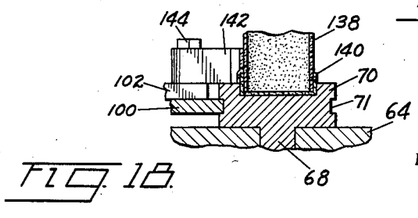
Fig. 18 is a sectional view taken on the line 18—18 of Fig. 17.

Figs. 17 and 18 show the socket with a container 138 therein that is square in cross section. Such container has a closure cap 140. The ironer plate 102 which is slidably supported as hereinabove described has an iron element proper 142 pivoted thereto by a pin 144 so as to swivel to permit the iron element to pass around the corners of the container. It is understood of course that this iron element assembly is slidable in and out as has heretofore been described.

If desired the iron may be heated and in Figs. 19 and 20 an iron indicated as 146 is shown as provided with electric heating coils 148. An electric connection might be led thereto in a conventional manner.

At the beginning of the wrapping movement the parts are positioned as shown in Fig. 2. The iron is withdrawn away from the container by the cam 120; the knife is held withdrawn by its spring; the tape carrier has moved inwardly over cam face 65 of the disc and the free end of the tape 93 is projected between the container 138 and the iron 104. It is understood that the end of container 138 with closure cap 140 received thereover has been inserted within the socket of the positioning support 70 as shown in Fig. 3 and is held therein against rotation by one hand of the operator.

Upon depression of the treadle 60 plunger 58 is withdrawn from engagement with the disc 54 and gear 48 is released to manual rotation through crank 46. Rotation of this crank will swing the tape carrier assembly and ironer assembly counterclockwise about the disc. The roller bearing guide 86 of the carrier assembly rides over the periphery of the disc 64. This periphery is contoured so that for approximately the first 90° of counterclockwise movement away from the cam face 65 the path of movement is eccentric and thereafter it is concentric. Throughout the eccentric portion the carrier, as it is advanced, is moved outwardly with respect to the article being wrapped the radial distance represented by the cam face 65. This outward movement withdraws tape from the carrier roll in excess of that which is required to form one complete wrap about the article. This excess of tape provides the overlap 142 and represents the distance of projection of the free end of the tape between the iron and the article to be wrapped as shown in Fig. 2.

As the movement of revolution gets under way the cam pin 118 rides off the cam 120 (note Fig. 10) and the iron is projected under tension of spring 112 toward the article anchoring the end of the tape thereagainst so as to insure withdrawal of tape from the roll and the iron travels over the tape as it is wrapped about the article securing the tape snugly thereto. The face of the iron may be shaped as shown in Fig. 3 to embrace the roll and the cap snugly. The tape itself may be creped adhesive tape which is stretchable to conform snugly to different diameters as established by the cap 140 and the container wall 138.

Figures 6, 8:
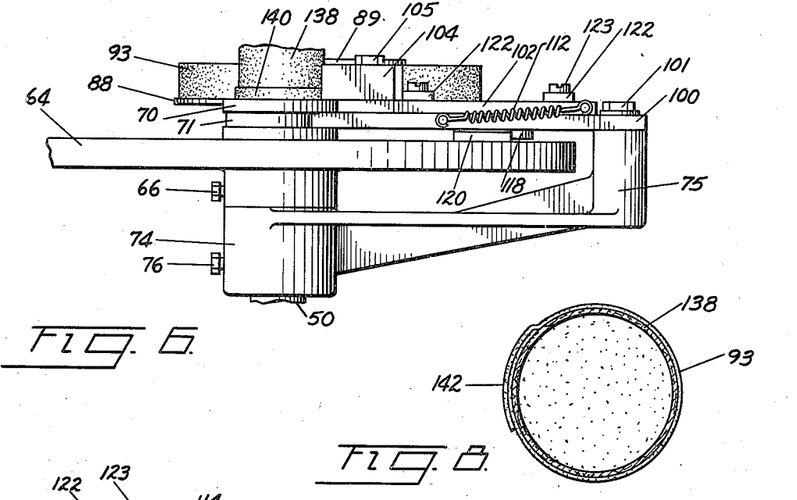
Fig. 6 is a view taken on section line 6—6 of Fig. 2.
Fig. 8 is a horizontal sectional view through a container provided with a wrapping as herein set forth.
Figure 7:
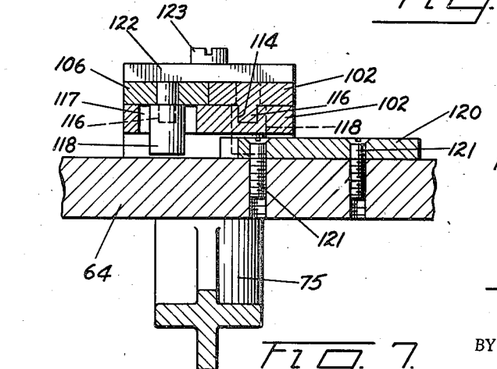
Fig. 7 is a view taken on section line 7—7 of Fig. 2.
Figure 9:
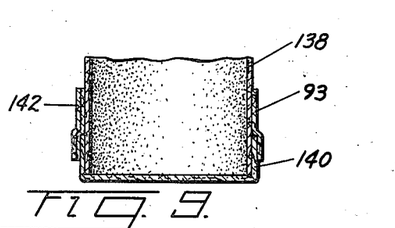
Fig. 9 is a vertical sectional view through a fragment of a container provided with a wrapping as herein set forth.

As the mechanism approaches the completion of one revolution advancing toward the relative position indicated in Fig. 11 the depending cam pin 118 of the cutting knife assembly rides over the stationary cam 120 on disc 64 and the cutting knife is projected as shown in Fig. 10 perforating and severing the tape so as to complete the wrap. The iron 104 follows through for a short distance following this severing to complete the wrap. It is apparent that by shaping the cam this follow-through of the iron can be so regulated that a small portion of the overlap will not be ironed down. It may be allowed to project for grasping as desired or it may be ironed down by the finger of the operator upon removal of the container. As shown in Fig. 8 it has been so ironed down.

It will be seen that the knife 108 is angular so that it approaches the tape angularly to facilitate severing of the tape and also as the revolution of the mechanism continues the knife is drawn away from the adhesive coated face of the tape and does not tend to stick thereto.

Following the severing of the tape as shown in Fig. 11 and during the completion of the wrap about the article the ironer 104 is withdrawn so that the article may be removed by the operator. As the assembly continues its revolution the carrier is moved inwardly over the cam face 65 by spring 84 to the position shown in Fig. 2 and during this inward movement the severed end of the tape 93 is projected between the iron 104 and the container 138 as shown in Fig. 2. The tape is now in position for a second operation which corresponds to that heretofore described.

In the operation of the construction shown in Figs. 12 and 13 there is a difference in that this structure is designed to accommodate tape which has very strong adhesion upon its roll, and considerable effort is required to withdraw it. The engagement of the free end of the tape by the iron anchoring it against the article might not be sufficient to hold the tape to insure withdrawal. For this reason the tape carrier roll is shown as mounted upon secondary arm 132. This secondary arm can swing inwardly toward the article wrapped until it engages the stop 145 which is shown in Figs. 12 and 13. By virtue of this permitted inward swing it is possible to utilize tape already withdrawn from the roll throughout the initial portion of the wrap about the article. After the tape has been wrapped about the article for a sufficient distance to anchor the same tape will be withdrawn from the roll as the revolution continues. As the mechanism approaches the cam 130 the roller guide 136 rides over such cam and swings the secondary arm 132 outwardly to the position shown in Fig. 12. As the secondary arm swings outwardly it withdraws the excess of tape needed for the overlap. In this construction it will be seen that the withdrawal of excess of tape is at the end of the revolution rather than at the beginning as is the case in the structure shown in Figs. 1 to 11.

In both structures at the completion of each revolution if the foot is held removed from the treadle 60 plunger 58 will rise to engage disc 54 to stop the mechanism at the proper place for beginning of a second wrapping operation.

What is claimed:

1. A machine for wrapping tape about a container comprising, in combination, a support to position a container exposed for wrapping tape thereabout, a tape dispensing carrier mounted for revolution about the container positioned upon the support to wrap tape thereabout, an ironer constrained to hold the tape dispensed from the carrier against the container as the carrier revolves thereabout a knife revolvable about the container and constrained away from the tape during its revolution about the container, and means acting upon the knife during the final portion of its revolution urging it against the tape adjacent the container to sever the tape.

2. A machine for wrapping tape about a container comprising, in combination, a support to position a container exposed for wrapping tape thereabout, a tape dispensing carrier mounted for revolution about the container positioned upon the support to wrap tape thereabout, an ironer supported to revolve about the container and adapted to travel over the tape wrapped thereabout by the carrier and to urge the tape against the container, means guiding the carrier during each revolution about the container to follow a path to withdraw tape in excess of that required for a complete wrap about the container and guiding the carrier upon the completion of each wrap about the container to project such excess of tape counter the direction of wrap to form an overlap for the succeeding wrap.

3. A machine for wrapping tape about a container comprising, in combination, a support to position a container exposed for wrapping tape thereabout, a tape dispensing carrier mounted for revolution about said support, an ironer held to urge tape dispensed from the carrier against the container positioned upon the support and itself supported to revolve thereabout, means operable upon the completion of each wrap of the tape about the container to sever the tape adjacent to the container, and means operable during each revolution of the carrier to cause it to dispense tape therefrom in excess of that required to form a complete wrap about the container.

4. A machine for wrapping tape about an article comprising, in combination, a support to position an article exposed for wrapping tape thereabout, a tape dispensing carrier supported for revolution about the article positioned upon the support, an ironer supported for revolution about this supported article and adapted to urge tape withdrawn from the carrier against said article as the ironer revolves thereabout, means acting upon the ironer during the final portion of each revolution about the container withdrawing it away from the container, means operable to sever the tape between the carrier and container upon the completion of each wrap, and means urging the severed end of the tape into the space between the container and ironer following the severing of the tape.

5. A machine for wrapping tape about a container comprising, in combination, a support to position one end of a container having an end closure exposed for wrapping tape about the container and end closure, a tape dispensing carrier supported for revolution about the container positioned upon the support to wrap tape thereabout, an ironer supported for revolution about the support, means holding the ironer to travel during its revolution over the tape wrapped about the container urging the tape thereagainst, means operable upon the completion of a wrap of the tape about the container to sever the tape, means guiding the carrier to travel outwardly away from the container during a portion of its revolution thereabout to withdraw tape in excess of that required for a complete wrap about the container and to travel inwardly toward the container following severing of the tape to project its severed end toward the container.

6. A machine for wrapping tape about a container comprising, in combination, a support to position a container exposed for wrapping tape thereabout, a tape dispensing carrier supported for revolution about the container positioned upon the support to wrap tape thereabout, an ironer supported for revolution about the support, means holding the ironer to travel during its revolution over the tape wrapped about the container urging the tape thereagainst, means constraining the tape carrier to follow an eccentric path during the course of each revolution to withdraw tape in excess of that required to complete a wrap about the article.

7. A machine for wrapping tape about a container comprising, in combination, a support to position a container exposed for wrapping tape thereabout, a tape dispensing carrier supported for revolution about the container positioned upon the support to wrap tape thereabout, means constraining the carrier to follow an eccentric path during a portion of each revolution to withdraw tape in excess of that required to complete a wrap about the container, means adapted to hold the tape wrapped about the article thereagainst during revolution of the carrier about the article, cutting means acting to sever the tape between the article and the carrier upon completion of each wrap about the article and means acting upon the carrier to project the severed tape end toward the article prior to each revolution of the carrier about the article.

8. A machine for wrapping tape about a container comprising, in combination, a support to position a container for wrapping tape thereabout, a tape dispensing carrier supported for revolution about a container positioned upon the support to wrap tape thereabout, an ironer supported for revolution about the container positioned upon the support, said ironer held to travel over the tape wrapped about the container urging the tape thereagainst, means acting upon the carrier during each revolution to withdraw tape therefrom in excess of that required to form a complete wrap about the container, cutting means operable upon the completion of each wrap of the tape about the container to sever the tape between the container and the tape carrier, means constraining the ironer to hold it away from the container upon the completion of each wrap of tape thereabout, and means guiding the carrier in its revolution about the container following each severing operation to project the severed tape end toward the container between the ironer and the container.

9. A machine for wrapping tape about a container comprising, in combination, a support to position a container exposed for wrapping tape thereabout, a tape dispensing carrier supported for revolution about the container positioned upon the support to wrap tape thereabout, an ironer including a driven element supported for revolution about the support, means holding the ironer to travel during its revolution over the tape wrapped about the container urging the tape thereagainst, means disposed in the path of revolution of the driven element of the ironer adapted to withdraw the ironer away from the article during a portion of its revolution.

10. A machine for wrapping tape about a container comprising, in combination, a support to position a container exposed for wrapping tape thereabout, a tape dispensing carrier supported for revolution about the container positioned upon the support to wrap tape thereabout, an ironer including a driven element supported for revolution about the support, means holding the ironer to travel during its revolution over the tape wrapped about the container urging the tape thereagainst, means disposed in the path of revolution of the driven element of the ironer adapted to withdraw the ironer away from the container during a portion of its revolution, cutting means responsive to the revolution of the tape carrier about the container to sever the tape, and means causing the carrier to move inwardly toward the container during its revolution thereabout and directly following the severing of the tape to direct the severed tape end within the space between the withdrawn ironer and container.

11. A machine for wrapping tape about a container comprising, in combination, a support to position a container exposed for wrapping tape thereabout, a tape dispensing carrier supported for revolution about the container positioned on the support to wrap tape thereabout, an ironer having a driven element supported for revolution about the support, said ironer held yieldingly to travel over the tape wrapped about the container urging the tape thereagainst, cutting means including a driven element supported for revolution about the support, said cutting means operable to sever the tape, means disposed in the path of revolution of the ironer driven element and the driven element of the cutting means operable to actuate the cutting means to sever the tape and operable thereafter to withdraw the ironer away from the article upon completion of each revolution thereabout.

12. A machine for wrapping tape about a container comprising, in combination, a support to position a container exposed for wrapping tape thereabout, a tape dispensing carrier supported for revolution about the container positioned on the support to wrap tape thereabout, an ironer including a driven element supported for revolution about the support, said ironer held yieldingly to travel over the tape wrapped about the container urging the tape thereagainst, cutting means including a driven element supported to revolve with the ironer about the container, means disposed in the path of revolution of the cutting means driven element operable to actuate it to cause the cutting means to sever the tape upon completion of each revolution, means disposed in the path of revolution of the ironer driven element operable to withdraw the ironer away from the article upon completion of each revolution, means guiding the revolution of the carrier about the container to direct it during its revolution away from the container to withdraw tape in excess of that required to form a single wrap and to direct it during each revolution toward the container to project the severed end of the tape between the container and the withdrawn ironer.

13. A machine for wrapping tape about a container comprising, in combination, a support to position a container exposed for wrapping tape thereabout, a tape dispensing carrier supported for revolution about the container positioned upon the support to wrap the tape thereabout, container positioned upon the support and held to travel over the tape thereabout urging the same thereagainst, means constraining the carrier through an end portion of each revolution to travel in an eccentric path to withdraw the tape in excess of that required to form a single wrap about the article.

14. A machine for wrapping tape about a container comprising, in combination, a support to position a container exposed for wrapping tape thereabout, a tape dispensing carrier supported for revolution about the container positioned upon the support to wrap the tape thereabout, an ironer supported for revolution about the container positioned upon the support and held to travel over the tape thereabout urging the same thereagainst, means constraining the carrier during the initial stage of each revolution about the container to travel eccentrically to withdraw tape in excess of that required to form a single wrap about the container.

15. A machine for wrapping tape about a container comprising, in combination, a support to position a container exposed for wrapping tape thereabout, a tape dispensing carrier supported for revolution about the container positioned upon the support to wrap the tape thereabout, an ironer supported for revolution about the container positioned upon the support and held to travel over the tape thereabout urging the same thereagainst, means constraining the carrier during the initial stage of each revolution about the article to travel eccentrically toward the container and means constraining the carrier during a subsequent stage in each revolution to travel eccentrically away from the container to withdraw tape in excess of that required to form a single wrap thereabout.

16. A machine for wrapping tape about a container comprising, in combination, a disc having a periphery adapted to serve as a track way, said disc provided with a centrally disposed socket adapted to receive one end of a container to project thereabove for wrapping, a tape roll carrier supported for revolution about the container positioned within said socket to wrap tape thereabout, said carrier having a bearing portion adapted to engage the periphery of the disc during revolution of the carrier to determine the path of travel of the carrier, means yieldingly holding the carrier with its bearing portion engaging the disc periphery, means operable to hold the tape wrapped about the container thereagainst during revolution of the carrier, said disc periphery having a portion arranged eccentrically to cause the carrier to move outwardly away from the socket during each revolution to withdraw tape in excess of that required to form a single wrap about the container.

17. A machine for wrapping tape about a container comprising, in combination, a support adapted to position a container exposed for wrapping, a table disc, a tape roll carrier supported for revolution about the container positioned on the support, means for holding the tape withdrawn from the roll against the container during revolution of the carrier thereabout, said carrier provided with a tape guide adapted to engage the opposite free side of the tape from that engaging the container between the container and the tape roll and so positioned as to constrain such portion of the tape out of a direct line whereby the tape is deflected between the carrier and the container.

18. A machine for wrapping tape about a container comprising, in combination, a socket to receive one end of a tubular container to expose the same for wrapping, a tape roll carrier supported for revolution about said socket, means constraining the carrier prior to each wrapping revolution to move radially a short distance toward the container to project the free end of the tape toward the container positioned within the socket for wrapping, means operable to urge the projected end of the tape withdrawn from the roll against the container and to travel over the tape wrapped about the container during the revolution of the carrier thereabout, said carrier provided with a guide through which the free end of the tape extends, said guide being curved transversely of the tape.

19. A machine for wrapping tape about a container comprising, in combination, a socket to receive one end of a tubular container to expose the same for wrapping, a tape roll carrier supported for revolution about said socket to wrap tape about the container positioned thereon, means operable to urge tape withdrawn from the roll against the article during revolution of the carrier thereabout, means constraining the carrier at one end of each revolution to move a short distance radially toward the container to project the end of the tape toward the container positioned within the socket for wrapping.

20. A machine for wrapping tape about a container comprising, in combination, a stationary disc having an axial aperture adapted to receive a container socket, a container socket shaped to receive and position one end of a circular or noncircular container, said disc having a periphery concentric throughout a portion of its circumference with its axis and eccentric therewith throughout another portion of its circumference, a tape roll carrier, an ironer having a driven portion and a tape cutter having a driven portion supported to revolve about the socket along a path determined by the periphery of the disc, means disposed in the path of revolution of the driven portions of the ironer and cutter to urge the cutter against the tape at the completion of each revolution and to thereafter withdraw the ironer away from the tape.

21. A machine for wrapping tape about a container comprising, in combination, a stationary disc having an axial aperture adapted to receive a container socket, a container socket shaped to receive and position one end of a circular or noncircular container, said disc having a periphery concentric throughout a portion of its circumference with its axial aperture and eccentric therewith throughout another portion of its circumference, a tape roll carrier, an ironer and tape cutter supported to revolve about the socket along a path determined by the periphery of the disc to wrap tape about a container positioned in the socket, said ironer adapted to travel over the tape wrapped about the container within the socket during revolution of the ironer thereabout.

22. A machine for wrapping tape about an article comprising, in combination, a support to position an article exposed for wrapping tape thereabout, a tape dispensing carrier supported for revolution about the article positioned upon the support, and means causing the carrier during each revolution to dispense an excess of tape over that required for the wrap about the container and adapted to maintain the tape taut between the container and carrier during wrapping.

23. A machine for wrapping tape about an article comprising, in combination, a support to position an article exposed for wrapping tape thereabout, a tape dispensing carrier supported for revolution about the article positioned upon the support, means for urging tape withdrawn from the carrier against the article, and a knife supported to revolve about the article and to be urged against the tape withdrawn from the carrier between the carrier and the article to sever the tape, said knife supported to be urged against the tape between the carrier and container at an angle inclined in the general direction of travel of the tape.

24. The invention defined in claim 22 characterized in that ironer mechanism is provided adapted to urge the tape dispensed from the carrier against the container during wrapping of the tape thereabout.

25. The invention defined in claim 22 characterized in that ironer mechanism is provided adapted to urge the tape dispensed from the carrier against the container during wrapping of the tape thereabout and means is provided to direct the carrier to project the excess of tape withdrawn during a revolution of wrapping about the container over the face of the ironer counter the direction of wrap preceding a succeeding revolution of wrapping about the carrier.

WILLIAM ALFRED DAVIS.
BERNARD H. DAVIS.